No. 861,399. PATENTED JULY 30, 1907.
I. K. SCRIBNER.
DRAFT BAR.
APPLICATION FILED JUNE 21, 1906.
2 SHEETS—SHEET 1.
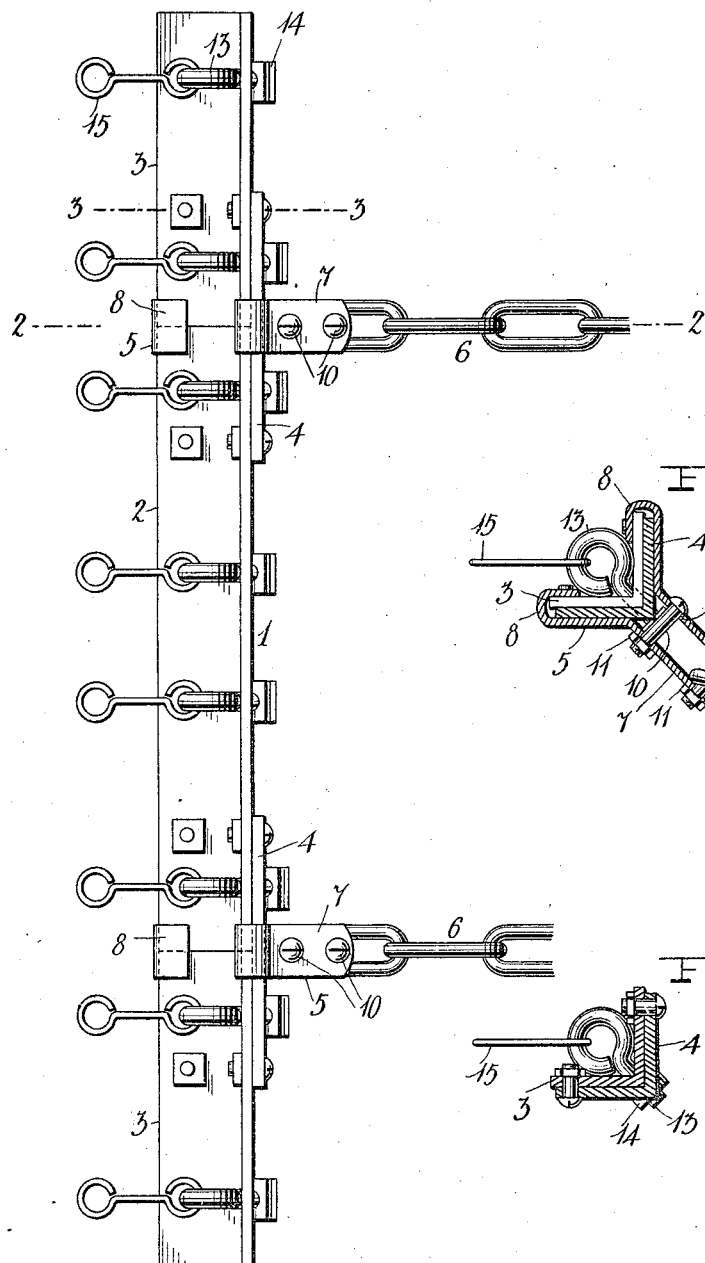
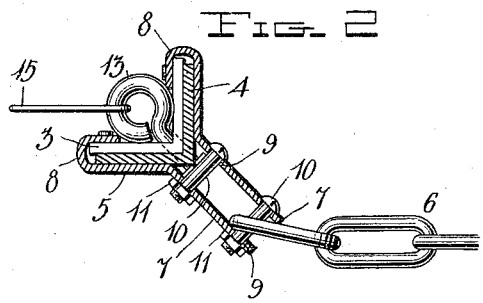
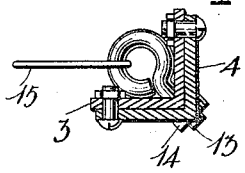
Witnesses
I. Jenkins
C. H. Griesbauer
Inventor
I. K. Scribner
by H. B. Willson & Co
Attorneys No. 861,399. PATENTED JULY 30, 1907.
I. K. SCRIBNER.
DRAFT BAR.
APPLICATION FILED JUNE 21, 1906.
2 SHEETS—SHEET 2.
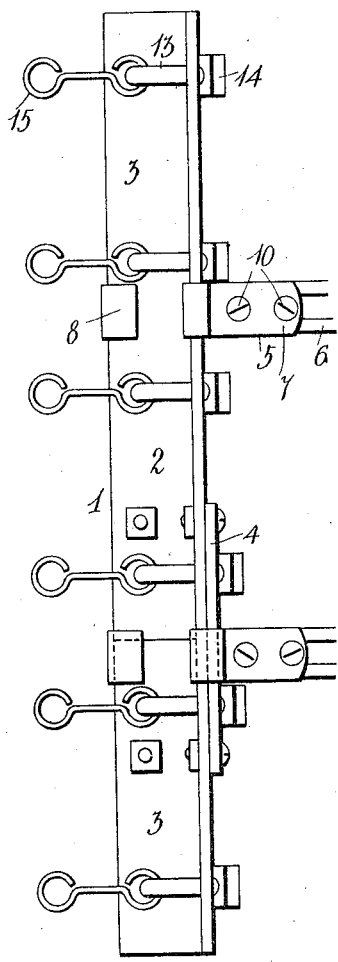
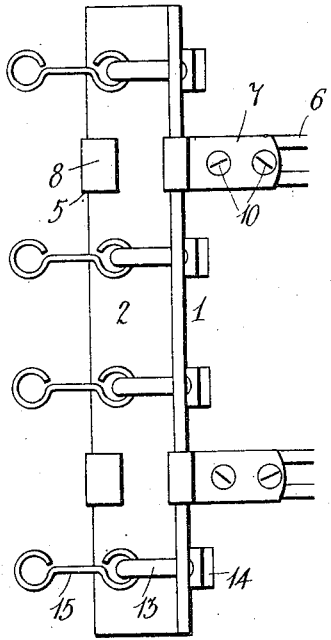
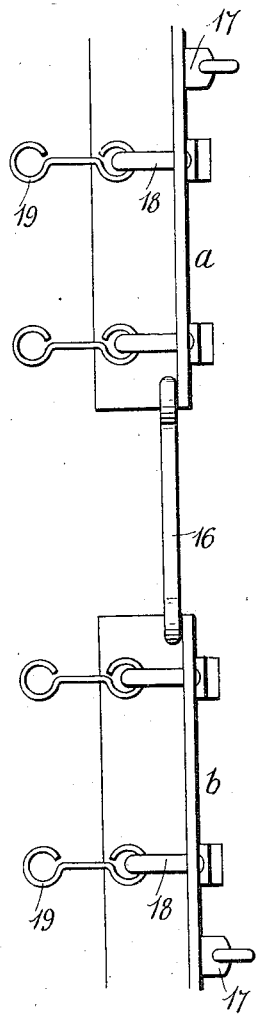
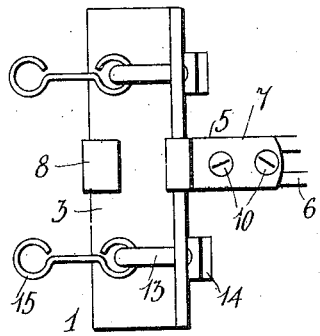
Witnesses
Inventor
I. K. Scribner,
by H. B. Willson & Co.
Attorneys

UNITED STATES PATENT OFFICE.

ISAAC K. SCRIBNER, OF TRUMAN, MINNESOTA.

DRAFT-BAR.

No. 861,399.  Specification of Letters Patent.  Patented July 30, 1907.

Application filed June 21, 1906. Serial No. 322,779.

*To all whom it may concern:*

Be it known that I, ISAAC K. SCRIBNER, a citizen of the United States, residing at Truman, in the county of Martin and State of Minnesota, have invented certain new and useful Improvements in Draft-Bars; and I do declare the following to be a full, clear, and exact description of the invention, such as will enable others skilled in the art to which it appertains to make and use the same.
This invention relates to improvements in draft bars for drags, harrows and the like.

The object of the invention is to provide a draft bar of this character adapted to be arranged for use with one, two, three or four horses.
With the above and other objects in view, the invention consists of certain novel features of construction, combination and arrangement of parts as will be hereinafter described and claimed.

In the accompanying drawings:—Figure 1 is a plan view of a draft bar constructed in accordance with the invention and showing the same arranged for use with four horses; Fig. 2 is a vertical cross sectional view on the line 2—2 of Fig. 1; Fig. 3 is a similar view on the line 3—3 of Fig. 1; Fig. 4 is a plan view of the bar arranged for use with three horses; Fig. 5 is a similar view, showing the bar arranged for two horses; Fig. 6 is a plan view of the one horse arrangement of the bar; and Fig. 7 is a plan view of a modified form of the bar.

Referring more particularly to the drawings, 1 denotes the draft bar, which may be constructed of any suitable metal and in any suitable form, said bar being here shown and is preferably constructed in the form of an angle iron bar. The bar 1 comprises a main or central section 2, and end sections 3, said end sections being adapted to be secured to one or both of the opposite ends of the main section 2, by means of angle iron splice bars which are bolted or otherwise secured on the outer sides of the central and end sections, as shown.
Adapted to be adjustably secured to the draft bar 1 are clips 5, to which are connected draft chains 6, to which are attached whiffletrees or other draft device (not shown). The clips 5 are preferably formed in two sections or plates, the forward ends 7 of which are bent outwardly at an angle corresponding to the angle of the sides of the draft bar with which the same are engaged. The extreme outer ends of said angularly bent portions are bent to form hooks 8, which are engaged with the edges of the angle iron bar 1, as clearly shown in Fig. 2 of the drawings. The opposite ends of the clip bars or plates project forwardly and in a parallel position one above the other, said ends having formed therein alined bolt holes 9, through which are adapted to be inserted clamping bolts 10. On the lower ends of the bolts 10 are screwed nuts 11, by means of which the plates of the clips are clamped into tight engagement with the sides of the draft bar, thereby securing the clips in place. Adapted to be connected with the forward bolts 10 of the clips are the draft chains 6, to the free ends of which are adapted to be connected suitable draft devices as hereinbefore described.

In the angle of the main and end sections of the draft bar are disposed eye-bolts 13, the ends of which project forwardly through the apex or corner of the angle iron draft bar of the sections and are adapted to have screwed thereon securing nuts 14. To the eye-bolts 13 are connected draft links 15, by means of which the draft bar is attached to the harrow or drag.

In the arrangement of the parts as shown in Fig. 1 the bar is adapted for use with four horses. In order to change the bar for use in connection with three horses, as shown in Fig. 4, one of the end sections 3 and the splice bar or plate connected thereto are removed or detached from the main section of the draft bar and the attaching clips 5 shifted to proper positions. In arranging the device for use with two horses, as shown in Fig. 5, both the end sections 3 are detached together with the splice bars and simply the main or central section is employed. The attaching clips 5 are adjusted on this bar to suitable positions for connecting the draft devices. When it is desired to use the device for hitching one horse only one of the end pieces 3 is employed, one attaching clip 5 being arranged on said piece as clearly shown in Fig. 6 of the drawings.

In Fig. 7 of the drawings is shown a modified arrangement of the draft bar. In this instance, the bar is shown in two sections *a* and *b*, which are loosely connected together by a link 16. This construction of the bar acts to prevent the bending or breaking of the same when turning. The sections of the bar are provided midway between their ends with forwardly projecting draft plates 17, to which are connected draft devices (not shown). The sections are also provided with eye bolts 18 and links 19 for connecting the same with a harrow or drag as in the forms shown and described in connection with the first figures of the drawings.

By providing a draft bar constructed as herein shown and described, the same may be quickly changed for use in connection with one, two, three or four horses; and while I have shown the device as simply capable of use with said number of horses, it is obvious that by increasing the length or number of the parts and arranging therein an increased number of eye-bolts and hitching devices that any number of horses may be accommodated thereby.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A draft bar having attaching means to connect it with the article to be drawn, and clips adjustably connected with said bar and comprising pairs of plates bent at one end to conform with and engage the opposite sides of the draft bar, clamping bolts to hold said plates together and into engagement with said bar, and means for connecting the draft devices with said clips.

2. A draft bar having attaching means to connect it with the article to be drawn, attaching clips arranged on the front of said bar, said clips comprising upper and lower plates or bars having forwardly-projecting, parallel portions, diverging bar-engaging ends formed on said parallel portions, lugs formed on the outer ends of said diverging portions to engage the forward edges of said draft bar, clamping bolts to securely attach said plates to the bars, and draft chains to attach the draft devices to said clips.

3. A draft bar of the character described comprising a plurality of sections, splice bars adapted to connect said sections together, draft eye-bolts arranged in pairs in said sections, attaching links connected to said eye-bolts, clips adapted to be adjustably connected to said draft bar, said clips comprising pairs of plates bent at one end to conform with and engage the opposite sides of the draft bar, clamping bolts to hold said plates together and into engagement with said bar, and means to connect draft devices with said clips, substantially as described.

4. An angle iron draft bar comprising a main or central section, end sections disposed at each end of said main section, splice bars whereby said end sections are removably connected to said main section, eye-bolts arranged in pairs in the angle of said bar, attaching links connected to said eye-bolts, attaching clips arranged on the front side of said bar, said clips comprising upper and lower plates or bars having forwardly-projecting parallel portions, diverging bar engaging ends formed on said parallel portions, lugs formed on the outer ends of said diverging portions to engage the forward edges of said draft bar, clamping bolts to securely attach said plates to the bar and draft chains to attach draft devices with said clips, substantially as described.

In testimony whereof I have hereunto set my hand in presence of two subscribing witnesses:

ISAAC K. SCRIBNER.

Witnesses:
WM. E. WALLACE,
WALLIS L. HOOVER.